United States Patent [19]

Florence et al.

[11] 4,454,250

[45] Jun. 12, 1984

[54] LOW DENSITY CELLULAR POLYVINYL CHLORIDE

[75] Inventors: David M. Florence, Lancaster; Wayne E. Smith, Washington Borough, both of Pa.

[73] Assignee: Armstrong World Industries, Inc., Lancaster, Pa.

[21] Appl. No.: 508,184

[22] Filed: Jun. 27, 1983

Related U.S. Application Data

[63] Continuation-in-part of Ser. No. 336,778, Jan. 4, 1982, abandoned.

[51] Int. Cl.$^3$ .................................................. C08J 9/06
[52] U.S. Cl. ........................................ 521/75; 521/73; 521/139; 521/140; 521/145; 525/193
[58] Field of Search ................. 525/193; 521/75, 145, 521/140

[56] References Cited

U.S. PATENT DOCUMENTS

| | | | |
|---|---|---|---|
| 2,757,147 | 7/1956 | Pooley | 521/75 |
| 2,901,774 | 9/1959 | Pooley | 521/75 |
| 3,066,110 | 11/1962 | Cornell | 521/75 |
| 3,211,677 | 10/1965 | Field et al. | 521/145 |
| 3,983,295 | 9/1976 | Murer et al. | 521/75 |
| 3,993,607 | 11/1976 | Florence | 521/140 |
| 4,203,815 | 5/1980 | Noda et al. | 521/140 |
| 4,245,055 | 1/1981 | Smith | 521/140 |

*Primary Examiner*—Morton Foelak

[57] ABSTRACT

A blend is provided which is suitable for preparing low density cellular products of the closed cell type, said blend comprising a vinyl chloride resin, e.g., polyvinyl chloride; a butadiene rubber, e.g., butadiene-acrylonitrile; and a liquid polyfunctional or monofunctional monomer, e.g., styrene. Insulation products such as sheets or tubes (for pipe insulation) are easily fabricated by freely expanding (i.e., without employing forming molds) blends of the invention which contain heat-activatable blowing agents.

18 Claims, No Drawings

LOW DENSITY CELLULAR POLYVINYL CHLORIDE

This application is a continuation-in-part application of copending application Ser. No. 336,778, filed Jan. 4, 1982, now abandoned.

FIELD OF THE INVENTION

The present invention relates to expanded or foamed vinyl chloride resins and, more particularly, is directed to foamable blends of polyvinyl chloride resin and a rubber which are adapted to be expanded to provide flexible, cellular products having a substantially closed-cell cellular system.

BACKGROUND OF THE INVENTION

Cellular products such as sheets and tubes of expanded blends of polyvinyl chloride resin and certain rubbers have achieved wide use as insulating materials, particularly for pipe insulation.

Expansible blends of polyvinyl chloride resin and certain rubbers that provide foamed products having a closed cell system are described in, for example, U.S. Pat. Nos. 2,849,028 and 4,245,055. In general, the aforementioned patents disclose a method of incorporating a blowing agent into a foamable resin/rubber blend which can be heated to decompose the blowing agent and thereby provide an expanded cellular object without the use of any forming molds. For instance, U.S. Pat. No. 2,849,028 discloses blends of polyvinyl chloride resin and butadiene-acrylonitrile copolymer rubber that are freely expanded at a temperature of about 300° F. to provide cellular products useful for pipe insulation. U.S. Pat. No. 4,245,055 discloses similarly prepared cellular products prepared from a blend which includes polymethylmethacrylate.

SUMMARY OF THE INVENTION

According to the present invention there is provided a resin blend adapted to be expanded to provide a cellular product of the closed cell type, said blend comprising: (a) between about 40% and about 80% by weight of a vinyl chloride resin, e.g., polyvinyl chloride; (b) between about 5% and about 40% of a rubber, e.g. butadiene-acrylonitrile rubber; and, (c) a polyfunctional or monofunctional monomer, e.g., styrene. Preferably, the polyfunctional or monofunctional monomer is selected from the group consisting of trimethylolpropane trimethacrylate, diallyl phthalate or styrene, and is present in an amount between about 10% and about 40% by weight, wherein all aforementioned weight percentages are based upon the total weight of components (a), (b) and (c).

According to the present invention there is further provided a cellular structure of the closed cell type comprising between about 40% and about 80% by weight of a vinyl chloride resin; between about 5% and about 40% by weight of a rubber; and between about 10% and about 40% by weight of a polyfunctional or monofunctional monomer wherein said weight percentages are based upon the total weight of said resin, rubber and monomer. The cellular product of the present invention may be either flexible or rigid and of closed cell cellular structure.

PREFERRED EMBODIMENT OF THE INVENTION

The vinyl chloride resin component of the blends of the present invention includes homopolymers such as, for example, polyvinyl chloride (PVC) and copolymers such as, for example, copolymers of vinyl chloride-vinyl acetate (VCVA). The PVC and VCVA resins are standard articles of commerce which are readily available in the form of a white powder. Suitable PVC and VCVA resins useful for preparing foamable blends of the present invention include, for example, the following: Geon ® 121 resin (B. F. Goodrich Company); FPC 4301 resin (Firestone Company).

The vinyl chloride resin component is present in the blends of the present invention in an amount between about 40% and about 80% by weight, preferably about 60% by weight. For instance, mixtures of PVC and VCVA may be used at the preferred quantity of 60% by weight wherein the ratio of VCVA:PVC is 3:1. The relative amounts of the VCVA and PVC components can be varied widely to achieve desired product properties. For example, increasing the amount of the VCVA copolymer provides cellular structures having lower softening temperatures which would be advantageous when thermoforming the cellular structures. On the other hand, higher amounts of the PVC homopolymer provide cellular products having higher softening temperatures.

The rubber component of the foamable blend of the present invention includes copolymers of butadiene such as, for example, a butadiene-styrene copolymer and a butadiene-acrylonitrile copolymer. Suitable butadiene rubbers for use in the blends of the present invention include, for example, the following: Paracril ® B acrylonitrile-butadiene copolymer (Uniroyal, Inc.); Hycar 1022 acrylonitrile copolymer (B. F. Goodrich Chemical Company); Chemigum N612B (Goodyear Tire & Rubber Co.).

The butadiene rubber component is present in the blends of the invention in an amount between about 5% and 40% by weight, preferably 15% by weight. Cellular products having greater flexibility and resilience are obtained when using higher quantities of the rubber component. Conversely, cellular products having greater rigidity are obtained when using lower quantities of the rubber component.

The polyfunctional or monofunctional monomer that constitutes an essential feature of the blends of the present invention includes monomers such as, for example, trimethylolpropane trimethacrylate, styrene and diallyl phthalate. Suitable liquid polyfunctional or monofunctional monomers for use in the blends of the present invention include, for example, the following: SR-350 (Sartomer Resins, Inc.); DAP Monomer (FMC Corporation); and Styrene Monomer, SM (Monsanto Company).

The polyfunctional or monofunctional monomer is present in the blends of the invention in an amount between about 10% and about 40%, preferably 25% by weight. Greater ease of processability of the resin blend is obtained when using the higher quantity of the polyfunctional monomer.

A significant feature and advantage of the resin blend of the present invention is that the polyfunctional or monofunctional monomer component acts as a plasticizer which provides for greater ease of processability mentioned above. Also, the polyfunctional or monofunctional monomer component results in cellular products of very low density (e.g., cellular products having a density below one pound per cubic foot have been obtained). Thus, the polyfunctional or monofunctional monomer enables the manufacture of cellular products that are both rigid and of low density.

If desired, any of the plasticizers normally used with resin or rubber systems may be incorporated into the blends of the present invention. The high-boiling esters, ethers, and ketones, for example, tricresol phosphate, dibutyl phthalate, di-2-ethylhexyl phthalate, butyl phthalyl butyl glycolate, dibutyl sebacate, and the like are suitable. Generally speaking, the amount of plasticizer is not critical. The amount of plasticizer normally used to give good workable compositions will suffice in the present case. As is well known, too large an amount of plasticizer will yield a soft product having extremely flexible cell walls. The amount of plasticizer will generally range between 5 and 60 parts by weight per 100 parts by weight rubber and preferably 30–50 parts by weight per 100 parts by weight rubber. Incorporating additional plasticizers into the blends of the invention is not necessary when making rigid cellular products therefrom.

Lubricants such as stearic acid, including waxes such as paraffin or ceresin wax or wax mixtures, may be used in small amounts. Chlorinated paraffins which generally contain 38%–70% chlorine can be used as a combination plasticizer and fire-retardant agent, particularly where antimony trioxide is used as part of the filler system. Other chlorinated plasticizers are suitable.

Various fillers may be incorporated into the blends of the invention in order to impart desired properties to the final product. Examples of such fillers are limestone, $TiO_2$, slate flour, clay, silica, and carbon black. The total amount of filler will generally run about 5–150 parts by weight per 100 parts by weight rubber and, preferably, will be between 35–45 parts by weight per 100 parts by weight rubber. Mixtures of fillers can be used if desired. It is often convenient to incorporate antimony trioxide as part or all of the filler system in order to impart flame resistance to the final cellular product. The antimony trioxide is preferably used in an amount of about 10–20 parts by weight per 100 parts by weight rubber. Pigments may be incorporated in order to impart the desired color to the final product; products having different colors are useful in keying a piping system to aid in the identification of the substances carried by the individual pipe lines. Where a black product is needed, carbon black may be incorporated to strengthen the final product, as well as to impart a uniform dead black color to the final product.

The blowing agent to be used will be any of the known, nitrogen-producing, chemical blowing agents to produce a closed cell structure. Such blowing agents include dinitroso pentamethylene tetramine, p,p' oxybis (benzene sulfonyl hydrazide), benzene sulfonyl hydrazine, p-toluene sulfonyl semicarbazide, and, preferably, azodicarbonamide.

Curing agent systems may be any of those thoroughly understood in the art to produce foamed products from resin/rubber blends. For instance, sulfur can be used to cure the rubber component of the resin blend of the invention. Also, conventional accelerator systems such as benzothiazole disulfide, zinc diethyl dithiocarbamate and diorthotolyl quanidine can be used.

Cross-linking agents such as, for example, organic peroxides, e.g., benzoyl peroxide, can be utilized to ensure substantially complete cross-linking of the polyfunctional monomer. For instance, the benzoyl peroxide can be added to the resin blend at the same time that the sulfur curing agent is added.

The compounding of the resin/rubber blend of the present invention, as well as the compounding of the entire foamable system in which it is used, may proceed in conventional manner. Rubbers, resins, fillers, plasticizers, waxes, fire retardants, smoke suppressants, and any other conventional ingredients in these foams would normally be first blended on a mill or a Banbury in accordance with conventional procedures. The rubber may first be broken down, if desired, and any other of these ingredients then added. When the portion of the final composition is suitably mixed, the curing agent system and the blowing agent may then be added. The point is, nothing in the resin/rubber blend of the present invention calls for special handling beyond that normally used in the art of blending rubbers and resins to make foamable mixtures.

At the same time, the resin/rubber blend of the present invention lends itself to compounding to achieve in the finished foam product any particular or special properties normally obtained in such products having the conventional higher density.

Once the completed composition has been prepared, it may be shaped as desired. To form pipe insulation, standard extruders may be used to extrude hollow cylinders in the desired sizes. Sheets may be formed by extruding, calendering, or molding. Specially shaped objects may be formed by molding.

Once the finished composition has been shaped into the desired form, it will be heated to a temperature sufficient to decompose the blowing agent and cure the system. As is known, these systems expand linearly in that the finished, foamed dimensions consistently bear a constant relationship to the dimensions of the unfoamed composition. Temperature for expansion and cure will normally be in the range of about 220°–360° F.

The principal advantage of the blends of the present invention is the ability to form unusually low density products in a reproducible manner. Cellular products having a density as low as 0.9 pounds per cubic foot have been obtained.

The thermal conductivity of the low density cellular products of the invention are lower and thus improved when compared to high density cellular products.

The following examples illustrate several embodiments of the invention.

In the following examples, the Closed Cell Content of the foamed products was determined in accordance with ASTM-D2856-70; Water Absorption was determined in accordance with ASTM-C209; and Water Vapor Permeability was determined in accordance with ASTM E-96, Procedure B (for Wet Cup).

EXAMPLES I–III

The following formulations can be compounded by conventional procedures well known in the art.

The following ingredients (quantities indicated on parts by weight basis) can be placed on a mill or in a Banbury mixer and blended at a temperature below about 250° F. during the conventional first process stage. The master batch product of Process Stage I is further processed in Stage II on a mill or in a Banbury mixer at a temperature below about 200° F.

| Ingredients | Example I | Example II | Example III |
|---|---|---|---|
| Process Stage I | | | |
| Butadiene - Acrylonitrile | 25 | 25 | 25 |
| PVC | 25 | 25 | 25 |
| VCVA | 75 | 75 | 75 |
| Trimethylol Propane Trimethacrylate | 40 | — | — |
| Styrene Monomer | — | 40 | — |
| Diallyl Phthlate Monomer | — | — | 40 |
| Polyethylene Glycol | 2.5 | 2.5 | 2.5 |
| Calcium Carbonate | 5 | 5 | 5 |
| Process Stage II | | | |
| Azodicarbonamide | 31 | 31 | 31 |
| Sulfur | 2 | 2 | 2 |
| Zinc Oxide | 2.5 | 2.5 | 2.5 |
| Zinc Dimethyl Dithiocarbonate | 0.5 | 0.5 | 0.5 |
| Dipentamethylene Thiuram Hexasulfide | 0.5 | 0.5 | 0.5 |

The milled or mixed final batch of Stage II can be extruded in a conventional manner at a temperature between about 125° F. and about 225° F. The shaped product can be expanded by heating at a temperature of between about 200° F. and about 360° F. to provide the cellular products of the invention. The closed cell product of Examples I, II, and III had a density of about 1.5 pounds per cubic foot.

EXAMPLES IV–VI

A master batch prepared from the ingredients listed (on a parts by weight basis) in Process Stage I was further processed in a mixer in Process Stage II at a temperature below about 200° F.

| | Examples | | |
|---|---|---|---|
| | IV | V | VI |
| Process Stage I | | | |
| PVC | 25 | 25 | 25 |
| VCVA | 75 | 75 | 75 |
| Styrene monomer | 75 | 15 | 70 |
| Butadiene acrylonitrile | 20 | 30 | 10 |
| Polyethylene glycol | 2.5 | 2.5 | 2.5 |
| Calcium carbonate | 5 | 5 | 5 |
| Process Stage II | | | |
| Azodicarbonamide | 36 | 28 | 34 |
| Sulfur | 2 | 2 | 2 |
| Zinc oxide | 2.5 | 2.5 | 2.5 |
| Zinc dimethyl dithiocarbamate | 0.5 | 0.5 | 0.5 |
| Dipentamethylene thiuram hexasulfide | 0.5 | 0.5 | 0.5 |
| Density, pounds per cubic foot | 1.5 | 1.5 | 1.5 |

Water absorption and water vapor permeability tests were conducted on representative closed cell products made in accordance with Examples I–VI, and these properties are listed in Table 1 for comparison with corresponding properties of open cell products.

TABLE 1

| Product | Closed Cell Content, % | Water Absorption % | Water Vapor Permeability, % |
|---|---|---|---|
| Closed Cell Product of Invention | >90 | 0.3 | <1.0 |
| Open Cell Product | 0-1 | 2.0 | 6.7 |

The low water absorption property of the closed cell expanded product of the invention is especially useful and beneficial when employed as an insulation product, resulting in better thermal performance as an insulator. Also, closed cell products have superior floatation properties compared to open cell products.

What is claimed is:

1. A resin blend adapted to be expanded to provide cellular products having a closed cell content of at least 90%, said blend comprising a blowing agent and between about 40% and about 80% by weight of a vinyl chloride resin; between about 10% and about 40% by weight of a butadiene rubber; and, a polyfunctional or monofunctional monomer, the percentages by weight being based on the total weight of resin, rubber and monomer.

2. The resin blend of claim 1 wherein said polyfunctional or monofunctional monomer is selected from the group consisting of trimethylolpropane trimethacrylate, styrene or diallyl phthalate.

3. The resin blend of claim 1 wherein said monofunctional monomer is styrene.

4. The resin blend of claim 2 or 3 wherein said vinyl chloride resin is polyvinyl chloride.

5. The resin blend of claim 4 wherein said butadiene rubber is a butadiene-acrylonitrile copolymer.

6. The resin blend of claim 2 or 3 wherein said vinyl chloride resin is a vinyl chloride-vinylacetate copolymer.

7. The resin blend of claim 6 wherein said butadiene rubber is a butadiene-acrylonitrile copolymer.

8. The resin blend of claim 2 or 3 wherein said vinyl chloride resin is a mixture of polyvinyl chloride and a vinyl chloride-vinyl acetate copolymer wherein the ratio of vinyl chloride-vinylacetate copolymer-to-polyvinyl chloride is about 3:1.

9. The resin blend of claim 8 wherein said butadiene rubber is a butadiene-acrylonitrile copolymer.

10. A cellular structure of the closed cell type having a closed cell content of at least 90% comprising between about 40% and about 80% by weight of a vinyl chloride resin; between about 10% and about 40% by weight of a rubber; and between about 10% and about 40% by weight of a polyfunctional or monofunctional monomer, the percentages by weight being based on the total weight of resin, rubber and monomer.

11. The cellular structure of claim 10 wherein said polyfunctional or monofunctional monomer is selected from the group consisting of trimethylolpropane trimethacrylate, styrene or diallyl phthalate.

12. The cellular structure of claim 10 wherein said monofunctional monomer is styrene.

13. The cellular structure of claim 11 or 12 wherein said vinyl chloride resin is polyvinyl chloride.

14. The cellular structure of claim 13 wherein said butadiene rubber is a butadiene-acrylonitrile copolymer.

15. The cellular structure of claim 11 or 12 wherein said vinyl chloride resin is a vinyl chloride-vinyl acetate copolymer.

16. The cellular structure of claim 15 wherein said butadiene rubber is a butadiene-acrylonitrile copolymer.

17. The cellular structure of claim 11 or 12 wherein said vinyl chloride resin is a mixture of polyvinyl chloride and a vinyl chloride-vinyl acetate copolymer wherein the ratio of vinyl chloride-vinyl acetate copolymer-to-polyvinyl chloride is about 3:1.

18. The cellular structure of claim 17 wherein said butadiene rubber is a butadiene-acrylonitrile copolymer.

* * * * *